United States Patent Office 3,743,480
Patented July 3, 1973

3,743,480
STERILIZATION OF BIOLOGICAL FLUIDS
John D. Falk, Corning, Iowa, assignor to Allied Chemical Corporation, New York, N.Y.
No Drawing. Filed Apr. 9, 1971, Ser. No. 132,825
Int. Cl. A61k 23/02
U.S. Cl. 21—2
15 Claims

ABSTRACT OF THE DISCLOSURE

A process for sterilization of a protein-containing fluid (e.g., blood serum) without coagulating the protein, comprising preliminarily filtering the fluid, adjusting the conductivity by dialysis, adjusting the pH if necessary to maintain the original pH, microfiltering the fluid to remove some bacterial matter, sterilizing at relatively low temperatures by microwave irradiation or by steam injection, and then readjusting the conductivity to its original level.

BACKGROUND OF THE DISCLOSURE

The instant invention is directed to a process for sterilizing biological fluids. More specifically, the instant invention is directed to a process for sterilizing biological fluids without coagulating the protein constituents contained therein. Most specifically, the instant invention is directed to a process for sterilizing biological fluid treated so that sterilization occurs at relatively low temperatures and results in the non-coagulation of the protein constituents of the fluid.

In the prior art, many methods have been advanced for sterilizing biological fluids. These methods are generally characterized by either high temperature sterilization, to destroy all microorganisms present in the fluid, or by filtration to filter out bacterial sized organisms. In high temperature sterilization because of the elevated temperatures required, not only are the microorganisms destroyed, but the protein constituents of the biological fluid are coagulated. In the prior art protein coagulation has seriously limited the volume of sterilized biological fluid since coagulation of the protein constituents of a biological fluid results in denaturization of the fluid.

In the filtration procedures of the prior art, many organisms smaller than the size of bacteria are not removed during filtration, thus, true sterilization is not achieved. The biological fluid may contain one or more viral or mycoplasma contaminants.

Applicant's co-pending application, "Sterilization of Protein Containing Fluids," Ser. No. 79,162, now U.S. Pat. No. 3,706,631 is directed to another process for sterilization of protein containing fluids. The co-pending application, provides significant improvements over the prior art methods, in that the method disclosed provides for sterilization of protein containing fluids without coagulation of the proteins. The instant application is a further improvement over the copending application in that certain changes have been made to permit still more moderate sterilizing conditions.

BRIEF SUMMARY OF THE INVENTION

The instant invention is directed to a method for sterilizing biological fluids without coagulating the protein constituents of the fluid. In the method of the instant invention the sterilization step occurs at lower temperatures than heretofore possible and is continuous.

In accordance with the instant invention, a method for sterilizing biological fluids, which contain protein constituents, is provided. The biological fluid is first pre-filtered to remove relatively large size particulate matter which may be entrained by the fluid. The fluid is next treated to adjust its ionic conductivity. Bacterial contamination may cause the fluid to become slightly acidic. In that event, the pH of the fluid is adjusted to its non-contaminated natural pH. After the conductivity adjustment step, which in a preferred tembodiment constitutes dialyzing the fluid, the biological fluid is sterilized. Sterilization comprises filtration, to remove bacterial contamination followed by low temperature heat sterilization to destroy viral and mycoplasma contaminants. After cooling the sterilized biological fluid, the ionic conductivity is readjusted to its pre-adjusted level. The sterilized biological fluid is thereafter aseptically packaged and is ready for use.

DETAILED DESCRIPTION

The process of the instant invention is directed to sterilization of biological fluids. Among the many fluids which are included within the meaning of a biological fluid are human and animal serums, human and animal plasmas, enzymes, hormones, tissue culture media and the like. The above list of biological fluids is not inclusive and other fluids used in any biological application is included within the scope of the instant invention. A common characteristic of all biological fluids, and a characteristics required by the definition of a biological fluid for the purposes of this invention, is that the fluid contain protein or other heat sensitive constituents.

In the process of the instant invention a biological fluid is first stirred to provide uniform consistency. The uniform product is then pre-filtered to remove the relatively large sized solid impurities contained within the fluid. In a preferred embodiment, the fluid is filtered to remove any solid particle whose size is greater than 200 microns.

The next step, in the process of the instant invention, is the reduction in the ionic conductivity of the pre-filtered, biological fluid. Although any method of conductivity adjustment may be used, in a preferred embodiment, dialysis is employed. It should be appreciated that other conductivity adjusting methods such as precipitation or chelation may be substituted. It has been found that lowering of ionic conductivity is an important step in assuring that the protein constituent in the biological fluid is not coagulated during sterilization. It is hypothesized that decreased ionic conductivity decreases salt bridge bonding. In salt bridge bonding, charged ions, attached to large protein molecules, are attracted to each other. This, in turn, results in a breakdown in the secondary or tertiary structure of the protein molecules. Therefore, conductivity adjustment, in theory, results in a significant decrease in alteration of the secondary or tertiary protein structure. Experimental results seem to substantiate, if not prove, the theory that ionic conductivity reduction is an important step in preevntion of protein coagulation during sterilization of biological fluids.

In the unique ionic conductivity adjustment procedure of the instant process, the biological fluid is dialyzed by the countercurrent flow of distilled water, which flows in conduits on either side of the biological fluid separated from the biological fluid by a porous membrane material forming a common wall for the water and biological fluid conduits. As those skilled in the art are aware, distilled water contains few or no ions. Thus, the biological fluid which contains relatively large concentration of ions gives up most of its ions to the distilled water due to the mass gradient between the two streams. The well known mechanism for this mass transfer is by osmosis of the ions across the porous membrane, from the biological fluid to the water. Of course, the greater the concentration of the ions in the biological fluid, the greater the driving force of ion exchange. In order to insure the purity of the distilled water, the water employed is double distilled, that is, the water goes through two distillation steps. More-over, the distilled water is made alkaline by adding a basic solution to the double distilled water if a pH adjustment is necessary due to bacterial contamination. In a preferred embodiment, the basic solution added is sodium hydroxide. Thus, if there is bacterial contamination, which causes acidification of the fluid, the distilled water, is treated with the hydroxide solution, so that it flows in the dialysis unit with a pH in the range of about 8 to 8.5. Using distilled alkaline water, instead of neutral water, has the effect of increasing the pH of the dialyzed, biological fluid to slightly above neutrality. In a preferred embodiment the dialyzed, conductivity adjusted biological fluid has a pH in the range of about 6.8 to 7.5. The biological fluid flows countercurrently to the flow of the distilled water in order to maintain the maximum concentration gradient between the water and the biological fluid throughout the length of the dialysis unit. During dialysis, the biological fluid is maintained under a positive pressure to promote reverse osmosis of the water contained in the biological fluid. In a preferred embodiment the biological fluid flows at a pressure of between about 5 to 15 p.s.i.g. The imposition of this pressure results in a reverse flow of approximately 10%, by volume, of the water contained within the biological fluid back into the distilled water stream.

The conductivity adjusted, biological fluid now is ready for sterilization. The first step in sterilization is a filtration step designed to remove bacterial contamination of the fluid. In a preferred embodiment, the filtration step involves a two-stage filtration operation. In the first stage, a 0.4 to 0.5 micron filter is employed and in the second stage a smaller sized 0.2 to 0.3 micron filter is used. The two-stage filtration step may occur in two separate stages, that is, the fluid may be filtered through the larger size filtering screen and thereafter enter a second filtration unit in which the fluid flows through the smaller size filter. Alternatively, a single filter having two filtering surfaces may be employed. Obviously, the upstream surface will be the larger sized filter while the downstream surface contains the smaller sized filter. This two-stage filtration step results in the removal of bacteria, bacterial spores, and the like. Micropore filtration of the type described above results in a lower temperature heating step during sterilization. As those skilled in the art are aware, some bacteria and bacterial spores are difficult to destroy unless relatively high temperature sterilizing means are employed. Their removal by filtration methods allows heat sterilization conditions of the biological fluid to be more moderate.

The filtered biological fluid is now ready for the second step in sterilization process, that is, heat sterilization of the fluid. In a preferred embodiment of the heat sterilization step, the fluid may be preheated. If the fluid is preheated, the temperature of the biological fluid is heated to about between 70° to 100° F. Although any of the well known methods of heating a fluid may be employed, in a preferred embodiment, a double-tube heat exchanger, using hot water as the heating medium, is employed. The preheating step increases the effectiveness of the heat sterilization step because it prevents thermoshocking of the biological fluid. The rapid temperature increase associated with heat sterilization, in the absence of the preheating step, may promote protein coagulation.

Immediately after preheating of the biological fluid, heat sterilization begins. Several heat sterilization methods may be employed. One preferred method is the use of microwave energy. Microwave sterilization is effective in that biological fluids, which contain protein, have high dielectric constants. A material with a high dielectric constant absorbs microwave energy and is thereby heated. Heat sterilization resulting from microwave heating occurs quite rapidly. This is particularly advantageous in that the shorter the time period a protein containing fluid is exposed to high temperatures, the lesser the possibility of protein coagulation. A second advantage of microwave sterilization is the effect of microwaves on microorganisms. Microorganisms destruction by microwave heating may result in lower time and temperature combinations than other heat sterilization methods.

Another preferred heat sterilization step employs steam. In steam sterilization, pressurized steam, usually superheated, is mixed with the biological fluid for very short intervals of time to destroy all viral and mycoplasma contaminants present in the fluid.

Still another preferred embodiment of heat sterilization employs a variation of the steam sterilization step. In this method, instead of superheated steam, pressurized saturated steam, whose quality ranges from saturated steam (quality of 1) to saturated water (quality of 0), is mixed with the biological fluid. Again, this process occurs during a very short period of time. This "wet steam" sterilization method is employed when lower temperatures and less extreme conditions are required in the heat step of the sterilization process.

In yet another preferred embodiment of heat sterilization, the biological fluid is heated in the inner tube of a double-pipe heat exchanger. The outer or annular tube provides a conduit for the flow of a heating medium such as hot water, steam, an organic liquid or the like. In a preferred embodiment, the heating medium flows at a temperature in the range of about 200° F. to 240° F. Also, preferably the two fluids flow countercurrently to each other. The exchanger is sufficiently long and flow rates are so set that the biological fluid approaches the heating medium temperature for a sufficient period of time to sterilize the fluid.

It should be appreciated that other heating sterilization methods, whose contact time is short or temperature is low and which does not result in denaturation of the biological fluid, may also be employed. In any case, sterilization occurs in the temperature range of about 100° F. to 240° F. As those skilled in the art are aware, this temperature range is lower than methods used in the prior art. This low temperature range is possible due to the micropore filtration step mentioned above. Microorganisms that do not pass through the micropore filters, for instance some bacteria and bacterial spores, are the most resistant to heat destruction. Thus, the sterilization conditions must be more severe when such organisms are present. In the absence of these organisms, sterilization conditions may be modified. The microorganisms that pass through the micropore filters, such as virus and mycoplasma are less resistant to destruction by heating means. Thus, temperatures required to destroy these microorganisms are lower than in the case where larger size microorganisms are present.

In order to insure that the biological fluid is not overheated, it is preferable to cool the fluid immediately after the heating step of the sterilization process is completed. Obviously, the longer a biological fluid, which contains protein constituents, is subjected to high temperatures the greater the opportunity for the protein to coagulate. Thus, a post-cooling step insures against this eventuality. In a preferred embodiment, the temperature of the sterilized biological fluid is cooled to below 100° F., preferably between about 50° F. and 70° F. The cooled, sterilized biological fluid is still not ready for use. Because the conductivity of the biological fluid is adjusted prior to sterilization, the fluid must be readjusted prior to use in biological applications. Therefore, the ionic constituents are now resupplied to the sterilized biological fluid. This is accomplished by adding a salt solution constituting approximately 10% by volume of the sterilized biological fluid. Thus, the original volume of biological fluid is replenished. It should be recalled that during the dialyzing step approximately 10% by volume of the water contained in the biological fluid was removed. In a preferred embodiment, a 10× isotonic sterile salt solution is added during the ionic conductivity readjustment step.

The uncoagulated, sterilized biological fluid is now aseptically packaged. In packaged form, the fluid may be stored at room temperature for later use in biological applications.

The following examples are given for the purpose of illustrating the process of the instant invention and should not be interpreted as limiting, in any way, the scope of the instant invention.

Example 1

A fetal bovine blood serum is sterilized by first passing the serum through a prefilter having openings that permit particles having a size less than 200 microns to pass therethrough. The ion concentration of the filtered serum is reduced to anionic conductivity, as measured by a conductivity meter, to a range of about 500 to 1,000 micromhos per cubic centimeter. Ionic concentration reduction occurs in a dialysis unit employing double distilled water. The water flows counter-currently to the flow of the serum, which is pressurized to 10 p.s.i.g. The pressure on the serum causes about 10% by volume of the water constituent therein to flow by reverse osmosis into the water stream. The serum leaves the dialysis unit with a pH of 7.2 after ionic conductivity adjustment. The serum is next passed through a two-stage micropore filter. The first stage eliminates all particles having a size greater than .45 micron, while the second, downstream stage filters out all particles larger than .22 micron. The filtered serum is thereafter heated in a double-tube heat exchanger to a temperature of about 100° F. Thereafter, the serum is subjected to a microwave source and thereby heated to a temperature of about 200° F. The microwave heated serum is thereafter immediately cooled, again in a double-tube heat exchanger, to a temperature of about 65° F. A volume of 10× isotonic sterile salt solution representing 10% of the volume of the sterilized serum is added to the serum. The serum is thereafter aseptically packaged.

A sample of serum taken from an aseptically packaged container is sterile, clear and non-coagulated. The serum is used as a nutrient for living cells. The cells grow normally in this environment.

Example 2

A sample of fetal bovine blood serum is treated in the same manner as Example 1 except that the serum is bacterially contaminated originally so that the serum has an acid pH. The serum is treated exactly as in Example 1 except that sodium hydroxide is added to the double distilled water to bring the pH of the distilled water to 8.2. The serum is passed through the dialysis unit, leaving with a pH of 7.2. The serum is thereafter treated as in Example 1. The sterilized serum is used as a nutrient for the normal growth of living cells.

Example 3

Another sample of the same fetal bovine blood serum is sterilized in the same matter as in Example 1 except that instead of subjecting the serum to microwave energy, the serum is mixed with superheated steam for a very short peroid of time. Under these conditions the serum is heated to a temperature of about 240° F. Again, the sterilized serum is clear and the protein fraction non-coagulated. The serum is effectively used as a nutrient for living cells.

Example 4

Still another sample of the same fetal bovin blood serum is sterilized in the same manner as in Example 1 except that instead of subjecting the serum to microwave energy the serum is mixed with hot saturated water until it reaches a temperature of about 220° F. and maintained for sufficient time to destroy all microorganisms. The sterilized serum is found to be clear with the protein fraction noncoagulated. The serum is used as a nutrient for living cells which grow normally.

Example 5

Yet still another sample of the same fetal bovine blood serum is sterilized in the same manner as in Example 1 except that instead of subjecting the serum to microwave energy, the serum is passed through an inner tube of a double pipe heat exchanger. The annular opening is provided with a heating medium such as steam, hot water, a hot organic liquid or the like flowing at a temperature of 240° F. The double pipe exchange is sufficiently long so that the serum approaches the heating temperature and is maintained at this temperature for a sufficient time to destroy any viral or mycoplasma present in the fluid.

The serum is clear and is used as a nutrient for living cells which grow normally.

Example 6

A sample of fetal bovine blood serum was inoculated with FS-1518 spores received from the National Canners Association, Washington, D.C. The spores were inoculated at the rate of 10,000 organisms per milliliter. The serum was thereafter sterilized in accordance with the procedure outlined in Example 1. The sterilized serum was clear and was successfully utilized as a nutrient for the normal growth of living cells.

Example 7

A sample of fetal bovine blood serum was inoculated as in Example 6. The serum was thereafter sterilized in accordance with the procedure of Example 3.

The sterilized serum was clear and was used as a nutrient for the normal growth of living cells.

Example 8

A sample of fetal bovine blood serum was inoculated as in Example 6. The serum was then sterilized in accordance with the procedure of Example 4.

The sterilized serum was clear and was used as a nutrient. Living cells grew normally with the serum as the nutrient.

Example 9

A sample of fetal bovine blood serum was inoculated as in Example 6. The serum was thereafter sterilized in accordance with the procedure of Example 5.

The sterilized serum was clear and was used as a nutrient for the normal growth of living cells.

Example 10

A sample of fetal bovine blood serum was inoculated with PA-3679 spores obtained from the National Canners Association, Washington, D.C. The spores were inoculated at the rate of 10,000 organisms per milliliter. The serum was sterilized in accordance with the procedure set out in Example 1.

The sterilized serum was clear and was successfully utilized as a nutrient for the normal growth of living cells.

Example 11

A sample of fetal bovine blood serum was inoculated as in Example 10. The serum was thereafter sterilized in accordance with the procedure of Example 3.

The sterilized serum was clear and was used as a nutrient for the normal growth of living cells.

Example 12

A sample of fetal bovine blood serum was inoculated as in Example 10. The serum was then sterilized in accordance with the procedure of Example 4.

The sterilized serum was clear and was used as a nutrient. Living cells grew normally with the serum as the nutrient.

Example 13

A sample of fetal bovine blood serum was inoculated as in Example 10. The serum was thereafter sterilized in accordance with the procedure of Example 5.

The sterilized serum was clear and was used as a nutrient for the normal growth of living cells.

Example 14

A sample of fetal bovine blood serum was inoculated with IBR virus, at a rate of 300 to 10,000 organisms per milliliter of serum, obtained from Armour Baldwin Laboratories, Elkhorn, Nebr. The serum was thereafter sterilized in accordance with procedure set out in Example 1.

The sterilized serum was clear and was successfully utilized as a nutrient for the normal growth of living cells.

Example 15

A sample of fetal bovine blood serum was inoculated as in Example 14. The serum was thereafter sterilized in accordance with the procedure of Example 3.

The sterilized serum was clear and was used as a nutrient for the normal growth of living cells.

Example 16

A sample of fetal bovine blood serum was inoculated as in Example 14. The serum was then sterilized in accordance with the procedure of Example 4.

The sterilized serum was clear and was used as a nutrient. Living cells grew normally with the serum as the nutrient.

Example 17

A sample of fetal bovine blood serum was inoculated as in Example 14. The serum was thereafter sterilized in accordance with the procedure of Example 5.

The sterilized serum was clear and was used as a nutrient for the normal growth of living cells.

Example 18

A sample of fetal bovine blood serum was inoculated with *Mycoplasma hominus* obtained from Iowa State University, Ames, Iowa. The serum was thereafter sterilized in accordance with the procedure set out in Example 1.

The sterilized serum was clear and was successfully utilized as a nutrient for the normal growth of living cells.

Example 19

A sample of fetal bovine blood serum was inoculated as in Example 18. The serum was thereafter sterilized in accordance with the procedure of Example 3.

The sterilized serum was clear and was used as a nutrient for the normal growth of living cells.

Example 20

A sample of fetal bovine blood serum was inoculated as in Example 18. The serum was then sterilized in accordance with the procedure of Example 4.

Thte sterilized serum was clear and was used as a nutrient. Living cells grew normally with the serum as the nutrient.

Example 21

A sample of fetal bovine blood serum was inoculated as in Example 18. The serum was thereafter sterilized in accordance with the procedure of Example 5.

The sterilized serum was clear and was used as a nutrient for the normal growth of living cells.

Example 22

A sample of fetal bovine blood serum was inoculated with Pseudomonas Aeurignos bacteria obtained from the University of Nebraska College of Medicine, Omaha, Nebr. The inoculated serum was then sterilized in accordance with the procedure set out in Example 1.

The sterilized serum was clear and was successfully used as a nutrient for the normal growth of living cells.

Example 23

A sample of fetal bovine blood serum was inoculated as in Example 22. The serum was thereafter sterilized in accordance with the procedure of Example 3.

The sterilized serum was clear and was used as a nutrient for the normal growth of living cells.

Example 24

A sample of fetal bovine blood serum was inoculated as in Example 22. The serum was then sterilized in accordance with the procedure of Example 4.

The sterilized serum was clear and was used as a nutrient. Living cells grew normally with the serum as the nutrient.

Example 25

A sample of fetal bovine blood serum was inoculated as in Example 22. The serum was thereafter sterilized in accordance with the procedure of Example 5.

The sterilized serum was clear and was used as a nutrient for the normal growth of living cells.

The foregoing detailed description and examples will make apparent other embodiments and examples that are within the scope and spirit of the instant invention. Thus, the scope of the instant invention should only be limited by the appended claims.

What is claimed is:

1. A process for sterilizing a protein-containing biological fluid, without coagulating the protein constituent of said fluid, comprising the steps of:
    (a) decreasing the ionic concentration of said biological fluid;
    (b) filtering the fluid to remove bacterial contamination;
    (c) heating the fluid to a temperature not greater than 240° F., whereby said fluid is sterilized; and
    (d) adding a sterile salt solution to said sterilized fluid so that said fluid contains the same ionic concentration as originally present.

2. A process in accordance with claim 1 including the step of prefiltering the fluid prior to decreasing the ionic concentration of said fluid.

3. A process in accordance with claim 1 including the step of preheating said fluid prior to said heating step.

4. A process in accordance with claim 1 including the step of immediately cooling said sterilized fluid to a temperature of less than 100° F.

5. A process in accordance with claim 1 wherein said biological fluid is heat sterilized by exposing said biological fluid is heat sterilized by exposing said biological fluid to microwave energy.

6. A process in accordance with claim 1 wherein said biological fluid is heat sterilized by mixing said fluid with pressurized steam.

7. A process in accordance with claim 1 wherein said biological fluid is heat sterilized by mixing said fluid with hot saturated water.

8. A process in accordance with claim 1 wherein said biological fluid is heat sterilized by flowing said fluid in the inner tube of a double pipe heat exchanger, heated by a heating medium flowing in the outer, annular tube of said exchanger.

9. A process for sterilizing blood serum comprising the steps of:
    (a) dialyzing said serum to decrease the concentration or ionic constituents contained in said serum;
    (b) filtering said serum to remove bacterial matter contained therein;
    (c) exposing said serum to temperatures in the range of about 100 to 240° F. for sufficient time to sterilize said serum; and
    (d) resupplying said sterilized serum with a sterile salt solution whereby said serum has the same ionic concentration as originally present before said dialyzing step.

10. A process in accordance with claim 9 including the step of prefiltering said serum prior to dialysis of said serum, whereby particles larger than microorganism size are removed.

11. A process in accordance with claim 9 including the step of preheating said serum to a temperature in the range of about 70 to 100° F. prior to sterilization of said serum.

12. A process in accordance with claim 9 wherein said serum is cooled immediately after sterilization of said serum to a temperature in the range of about 50 to 70° F.

13. A process in accordance with claim 9 wherein dialysis of said serum comprises passing said biological serum in countercurrent mass transfer relationship with distilled water.

14. A process in accordance with claim 13 wherein said dialysis step is further characterized by subjecting said serum, while flowing in countercurrent mass transfer relationship with said distilled water, to a pressure of about 10 p.s.i.g. whereby 10% by volume of said serum, in the form of water, is transferred to said distilled water.

15. A process in accordance with claim 14 wherein said dialysis step is further characterized by pretreating said distilled water with a basic solution to increase its pH to the range of about 8 to 8.5.

References Cited

UNITED STATES PATENTS

| | | | |
|---|---|---|---|
| 1,556,120 | 10/1925 | Mills | 424—101 X |
| 3,579,631 | 5/1971 | Stewart et al. | 21—56 X |
| 1,468,313 | 9/1923 | Lux | 260—112 B X |
| 2,833,691 | 5/1958 | Klaas | 260—112 B X |
| 2,897,123 | 7/1959 | Singher | 424—101 X |
| 3,284,301 | 11/1966 | Schor | 424—101 X |
| 2,625,488 | 1/1953 | Wasserman et al. | 99—216 |
| 3,489,647 | 1/1970 | Kolobow | 424—101 X |
| 3,462,361 | 8/1969 | Greenwalt et al. | 210—23 |

FOREIGN PATENTS 913,519  12/1962  Great Britain.

OTHER REFERENCES

"Blood Cells and Plasma Proteins," J. L. Tullis, 1953, pp. 61–66.

MORRIS O. WOLK, Primary Examiner

D. G. MILLMAN, Assistant Examiner

U.S. Cl. X.R.

21—54 R, 56; 99—216, 217; 195—1.8; 260—112 B

PO-1050
(5/69)

UNITED STATES PATENT OFFICE
CERTIFICATE OF CORRECTION

Patent No. 3,743,480          Dated July 3, 1973

Inventor(s) John D. Falk

It is certified that error appears in the above-identified patent and that said Letters Patent are hereby corrected as shown below:

Column 2, line 5, "tembodiment" should read -- embodiment --;
         line 53, "preevntion" should read -- prevention --.
Column 7, line 51, "Thte" should read -- The --.
Column 8, lines 44-45, "is heat sterilized by exposing said biological fluid" should be deleted;
         line 60, "or" should read -- of --.

Signed and sealed this 5th day of March 1974.

(SEAL)
Attest:

EDWARD M. FLETCHER, JR.          C. MARSHALL DANN
Attesting Officer                Commissioner of Patents